United States Patent
Meslioui (10) Patent No.: US 12,392,292 B2
(45) Date of Patent: Aug. 19, 2025

(54) ACOUSTIC PANEL WITH ACTIVE IMPEDANCE CONTROL

(71) Applicant: Pratt & Whitney Canada Corp., Longueuil (CA)

(72) Inventor: Sid-Ali Meslioui, Brossard (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/140,371

(22) Filed: Apr. 27, 2023

(65) Prior Publication Data
US 2024/0360793 A1    Oct. 31, 2024

(51) Int. Cl.
*F02C 7/24* (2006.01)
*B64D 33/04* (2006.01)

(52) U.S. Cl.
CPC ............... *F02C 7/24* (2013.01); *B64D 33/06* (2013.01)

(58) Field of Classification Search
CPC ........ G10K 11/172; G10K 11/16; F01N 1/02; F02C 7/24; F02C 7/045
See application file for complete search history.

(56) References Cited

U.S. PATENT DOCUMENTS

| | | | |
|---|---|---|---|
| 4,410,065 A | 10/1983 | Harvey | |
| 5,498,127 A | 3/1996 | Kraft | |
| 5,702,230 A | 12/1997 | Kraft | |
| 5,888,610 A | 3/1999 | Fournier | |
| 6,811,372 B1 * | 11/2004 | Emborg | G10K 11/172 415/196 |
| 7,055,648 B2 | 6/2006 | Byrne | |
| 8,033,358 B2 | 10/2011 | Ivers | |
| 8,111,832 B2 | 2/2012 | Jones | |
| 9,856,030 B2 | 1/2018 | Braden | |
| 2009/0045009 A1 | 2/2009 | Chiou | |
| 2019/0005938 A1 * | 1/2019 | Naya | B32B 7/12 |
| 2020/0309028 A1 * | 10/2020 | Murugappan | F02K 1/827 |

OTHER PUBLICATIONS

EP Search Report for EP Patent Application No. 24172390.7 dated Nov. 15, 2024.

* cited by examiner

*Primary Examiner* — Julie K Brocketti
*Assistant Examiner* — Rodolphe Andre Chabreyrie
(74) *Attorney, Agent, or Firm* — Getz Balich LLC (57) ABSTRACT

An acoustic system is provided that includes a face skin, a back skin and a cellular core arranged between the face skin and the back skin. The face skin includes a first member, a second member and a plurality of ports extending through the face skin. The first member includes a plurality of first perforations. The second member includes a plurality of second perforations and is configured to move along the first member. Each of the ports includes a respective one of the first perforations and a respective one of the second perforations. The cellular core includes a plurality of chambers. Each of the chambers extends between the face skin and the back skin. Each of the chambers is fluidly coupled with a respective one or more of the ports.

2 Claims, 12 Drawing Sheets

ACOUSTIC PANEL WITH ACTIVE IMPEDANCE CONTROL

TECHNICAL FIELD

This disclosure relates generally to an acoustic panel for, for example, an aircraft propulsion system.

BACKGROUND INFORMATION

An aircraft propulsion system may include one or more acoustic panels for attenuating sound generated by its gas turbine engine. Various types and configurations of acoustic panels are known in the art. While these known acoustic panels have various benefits, there is still room in the art for improvement.

SUMMARY

According to an aspect of the present disclosure, an acoustic system is provided that includes a face skin, a back skin and a cellular core arranged between the face skin and the back skin. The face skin includes a first member, a second member and a plurality of ports extending through the face skin. The first member includes a plurality of first perforations. The second member includes a plurality of second perforations and is configured to move along the first member. Each of the ports includes a respective one of the first perforations and a respective one of the second perforations. The cellular core includes a plurality of chambers. Each of the chambers extends between the face skin and the back skin. Each of the chambers is fluidly coupled with a respective one or more of the ports.

According to another aspect of the present disclosure, another acoustic system is provided that includes an acoustic panel and an actuation system. The acoustic panel includes a face skin, a back skin and a cellular core connected to the face skin and the back skin. The face skin includes a plurality of ports extending through the face skin. The face skin has an acoustic impedance. The cellular core includes a plurality of chambers. Each of the chambers extends from the face skin to the back skin. Each of the chambers is fluidly coupled with a respective one or more of the ports. The actuation system is operatively coupled with the acoustic panel. The actuation system is configured to manipulate the face skin to change the acoustic impedance during operation of the acoustic system.

According to still another aspect of the present disclosure, a method is provided for sound attenuation. During this method, an acoustic parameter is monitored at an acoustic panel. A sensor signal is provided indicative of the acoustic parameter. The acoustic panel includes a face skin, a back skin and a cellular core connected to the face skin and the back skin. The face skin includes a plurality of ports extending through the face skin. The cellular core includes a plurality of chambers. Each of the chambers extends from the face skin to the back skin. Each of the chambers is fluidly coupled with a respective one or more of the ports. The face skin is manipulated to change an acoustic impedance of the face skin based on the sensor signal.

The actuation system may be configured to manipulate the face skin to change a flow area of one or more of the ports.

The face skin may include an exterior member and an interior member between the exterior member and the cellular core. The actuation system may be configured to move one of the exterior member or the interior member along another one of the exterior member or the interior member to change the acoustic impedance.

The acoustic system may also include a sensor system configured to monitor an acoustic parameter and provide a sensor signal indicative of the acoustic parameter. The actuation system may be configured to manipulate the face skin based on the sensor signal.

The second member may be configured to move along the first member to change an acoustic impedance of the face skin.

The second member may be configured to move along the first member to change a flow area through each of the plurality of ports.

A first of the ports may include a first of the first perforations and a first of the second perforations. The second member may be configured to move along the first member between a first position and a second position. The first of the second perforations may overlap the first of the first perforations a first percentage when the second member is in the first position. The first of the second perforations may overlap the first of the first perforations a second percentage when the second member is in the second position. The second percentage may be different than the first percentage.

A first of the ports may include a first of the first perforations and a first of the second perforations. The first of the first perforations may have an elongated cross-sectional geometry. The first of the second perforations may have an elongated cross-sectional geometry.

The second member may be configured to move along the first member in a first direction. A major axis of the first of the first perforations and a major axis of the first of the second perforations may be parallel with the first direction.

The first member may be an exterior member of the face skin. The second member may be an interior member of the face skin. The interior member may be disposed between the exterior member and the cellular core.

The cellular core may be connected to the second member and the back skin.

The first member may be an interior member of the face skin. The second member may be an exterior member of the face skin. The interior member may be disposed between the exterior member and the cellular core.

The cellular core may be connected to the first member and the back skin.

The acoustic system may also include an acoustic panel including the face skin, the back skin and the cellular core. The acoustic panel may extend axially along and circumferentially about a centerline. The second member may be configured to move in an axial direction along the first member.

The acoustic system may also include an acoustic panel including the face skin, the back skin and the cellular core. The acoustic panel may extend axially along and circumferentially about a centerline. The second member may be configured to move in a circumferential direction along the first member.

The acoustic system may also include an actuation system configured to move the second member along the first member.

The acoustic system may also include a sensor system configured to monitor an acoustic parameter and provide a sensor signal indicative of the acoustic parameter. The actuation system may be configured to move the second member along the first member based on the sensor signal.

A first of the chambers may extend un-interrupted through the cellular core from the face skin to the back skin.

The cellular core may include a septum dividing a first of the chambers into a plurality of fluidly coupled sub-chambers.

The acoustic system may also include a component of an aircraft propulsion system. The component may include the face skin, the back skin and the cellular core.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
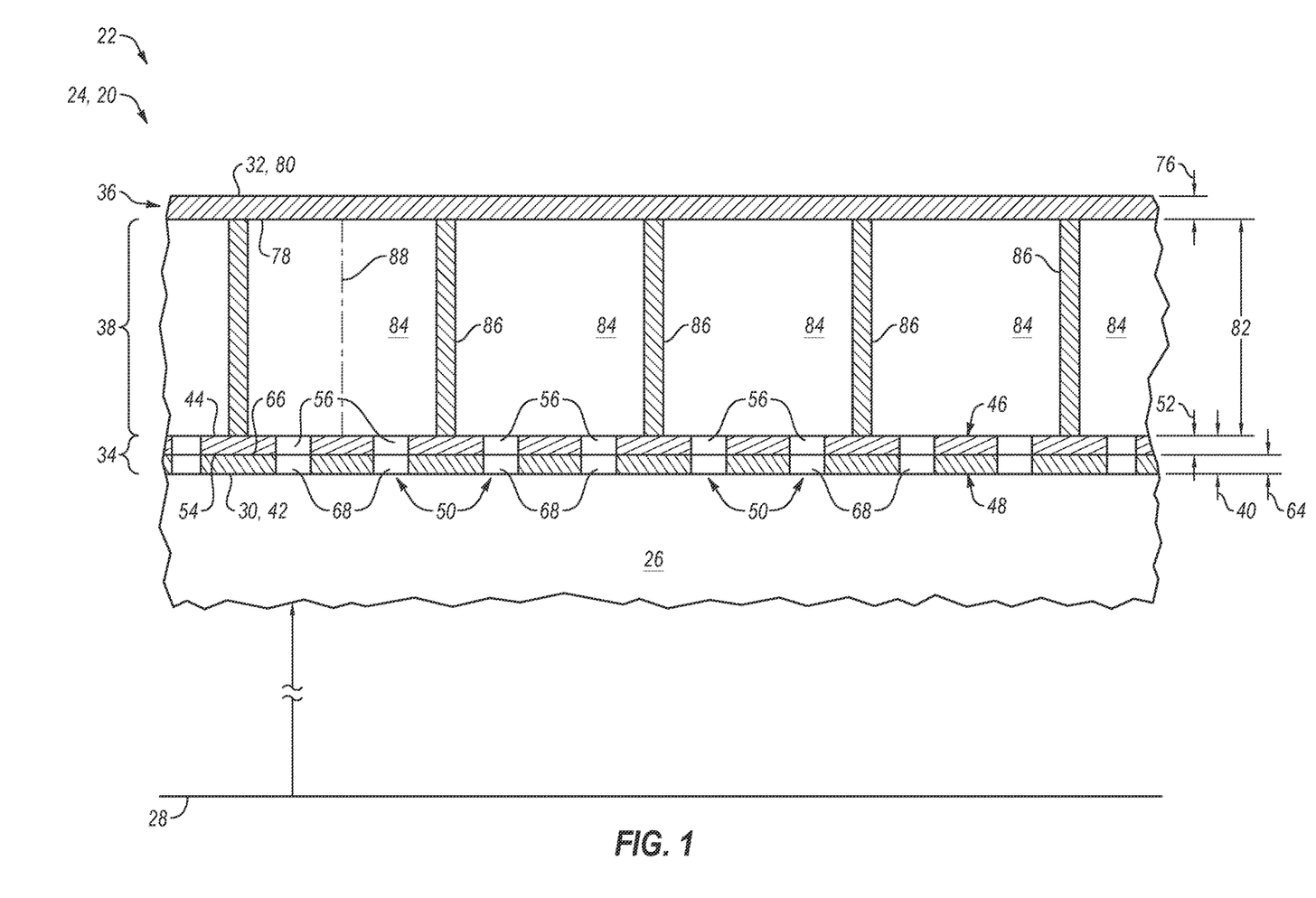
FIG. 1 is a partial side sectional illustration of an acoustic panel for an acoustic system.
Figure 2:
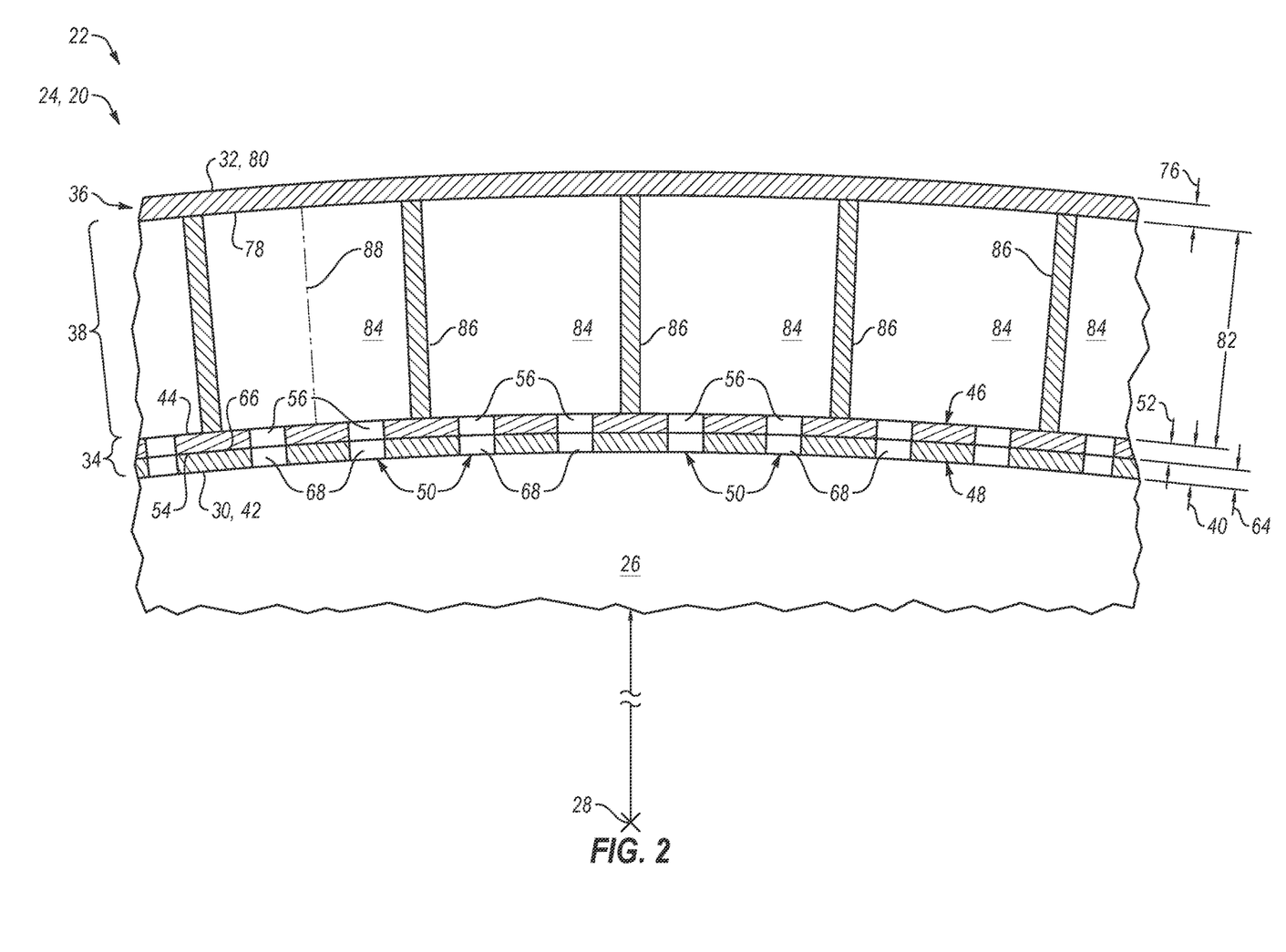
FIG. 2 is a partial cross-sectional illustration of the acoustic panel.

FIGS. 1 and 2 are partial sectional illustrations of a structural, acoustic panel 20 for an acoustic system 22 (e.g., an active impedance control system) of an aircraft. This acoustic panel 20 may be configured to attenuate sound (e.g., noise) generated by a propulsion system of the aircraft. The aircraft propulsion system may be a turbofan propulsion system, a turbojet propulsion system, a turboprop propulsion system or any other ducted-rotor or open-rotor aircraft propulsion system. The acoustic panel 20 may be part of a housing (e.g., a nacelle) for an engine (e.g., a gas turbine engine) of the aircraft propulsion system. The acoustic panel 20, for example, may be configured as or otherwise included as part of an inner barrel, an outer barrel, a translating sleeve, a blocker door, a bifurcation, etc. Alternatively, the acoustic panel 20 may be part of another component of the aircraft such as, but not limited to, an engine pylon, an aircraft wing or an aircraft fuselage. Furthermore, the acoustic panel 20 may also or alternatively be configured to attenuate aircraft related sound other than the sound generated by the aircraft propulsion system. However, for ease of description, the acoustic panel 20 may be described below as attenuating propulsion system sound and with respect to a component 24 (e.g., barrel) of the engine housing along a flowpath 26 (e.g., a bypass flowpath) within the aircraft propulsion system.

Referring to FIG. 1, the acoustic panel 20 extends axially along a centerline axis 28. Briefly, this centerline axis 28 may be a centerline axis of the aircraft propulsion system, a centerline axis of the engine housing and/or a centerline axis of the component 24 (e.g., the barrel) which is formed by or otherwise includes the acoustic panel 20. The acoustic panel 20 extends radially between and to a radial inner side 30 of the acoustic panel 20 and a radial outer side 32 of the acoustic panel 20. Referring to FIG. 2, the acoustic panel 20 extends circumferentially about (e.g., partially or completely around) the centerline axis 28. The component 24 and/or its acoustic panel 20 may thereby have a curved (e.g., arcuate, cylindrical, conical, frustoconical) geometry. The present disclosure, however, is not limited to such an exemplary curved geometry.

The acoustic panel 20 of FIGS. 1 and 2 includes a perforated face skin 34, a solid (e.g., non-perforated) back skin 36 and a cellular core 38. For ease of description, the face skin 34 is described below as an inner skin of the acoustic panel 20 and the back skin 36 is described below as an outer skin of the acoustic panel 20. With such an arrangement, the acoustic panel 20 and its face skin 34 may form an outer peripheral boundary of at least a portion of the flowpath 26 within the aircraft propulsion system. It is contemplated, however, the face skin 34 may alternatively be the acoustic panel outer skin and the back skin 36 may alternatively be the acoustic panel inner skin. With such an arrangement, the acoustic panel 20 and its face skin 34 may form an inner peripheral boundary of at least a portion of the flowpath 26 within the aircraft propulsion system. The present disclosure, of course, is not limited to the foregoing exemplary arrangements. The acoustic panel 20, for example, may form a circumferential side boundary of the flowpath 26 and/or may otherwise be located with the aircraft propulsion system and/or the aircraft.

The face skin 34 of FIGS. 1 and 2 extends axially along and circumferentially about the centerline axis 28. The face skin 34 has a radial thickness 40. This face skin thickness 40 extends radially between and to opposing sides 42 and 44 of the face skin 34, where the exterior side 42 of the face skin 34 is also the inner side 30 of the acoustic panel 20 of FIGS. 1 and 2. The face skin thickness 40 may remain uniform (e.g., constant) as the face skin 34 extends axially along and/or circumferentially about the centerline axis 28. The face skin 34 of FIGS. 1 and 2 includes a face skin interior member 46, a face skin exterior member 48 and a plurality of face skin ports 50.

The interior member 46 may be configured as an interior layer, an interior panel or another sheet-like body that forms an interior portion of the face skin 34. The interior member 46 of FIGS. 1 and 2, for example, is formed by a relatively thin sheet or layer of material that extends axially along and circumferentially about the centerline axis 28. This interior member material may be or otherwise include a metal, a polymer (e.g., a thermoplastic or thermoset material) or a fiber reinforced composite (e.g., fiber reinforcement such as fiberglass, carbon fiber and/or aramid fibers within a polymer matrix). The interior member 46 has a radial thickness 52. This interior member thickness 52 extends radially between and to the face skin interior side 44 and an exterior side 54 of the interior member 46 at an interface between the interior member 46 and the exterior member 48.

Figure 3:
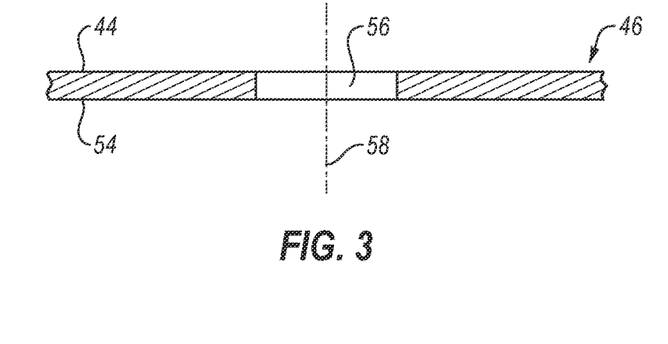
FIG. 3 is a partial side sectional illustration of an interior member of a face skin for the acoustic panel taken along line 3-3 in FIG. 4.
Figure 4:
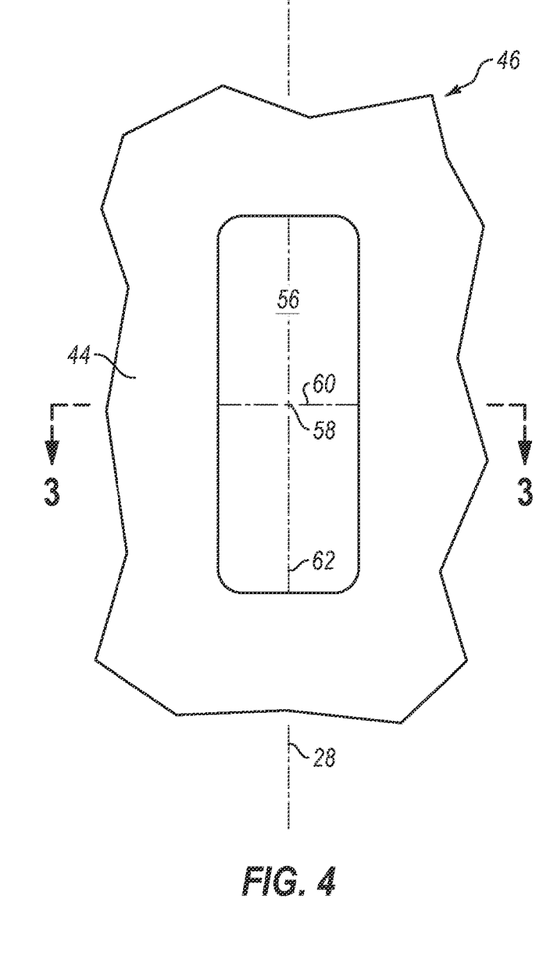
FIG. 4 is a partial illustration of the interior member of the face skin.

Referring to FIG. 3, the interior member 46 includes a plurality of interior member perforations 56 ("interior perforations"); e.g., through-holes such as slots or slits. Each of these interior perforations 56 extends generally radially through the interior member 46 along a centerline 58 of the respective interior perforation 56 from the interior member exterior side 54 to the face skin interior side 44. Referring to FIG. 4, each interior perforation 56 may have an elongated cross-sectional geometry when viewed, for example, in a reference plane perpendicular to the interior perforation centerline 58. The interior perforation 56 of FIG. 4, for example, has a minor axis 60 and a major axis 62, where a major axis dimension of the interior perforation 56 along the major axis 62 is larger than a minor axis dimension of the interior perforation 56 along the minor axis 60. Example shapes of the elongated cross-sectional geometry include, but are not limited to, a polygon (e.g., a rectangle with rounded or sharp corners) and an oval. For ease of description, the major axis 62 is shown as being parallel with the centerline axis 28. It is contemplated, however, the major axis 62 may alternatively be perpendicular to the centerline axis 28 or otherwise (e.g., non-zero acutely) angularly offset from the centerline axis 28 depending upon operation characteristics of the acoustic panel 20.

Referring to FIGS. 1 and 2, the exterior member 48 may be configured as an exterior layer, an exterior panel or another sheet-like body that forms an exterior portion of the face skin 34. The exterior member 48 of FIGS. 1 and 2, for example, is formed by a relatively thin sheet or layer of material that extends axially along and circumferentially about the centerline axis 28. This exterior member material may be or otherwise include a metal, a polymer (e.g., a thermoplastic or thermoset material) or a fiber reinforced composite (e.g., fiber reinforcement such as fiberglass, carbon fiber and/or aramid fibers within a polymer matrix). This exterior member material may be the same or different than the interior member material. The exterior member 48 has a radial thickness 64. This exterior member thickness 64 extends radially between and to the face skin exterior side 42 and an interior side 66 of the exterior member 48 at the interface between the interior member 46 and the exterior member 48. The exterior member thickness 64 of FIGS. 1 and 2 is equal to the interior member thickness 52. However, for select acoustic panel applications, the exterior member thickness 64 may alternatively be different (e.g., larger or smaller) than the interior member thickness 52.

Figure 5:
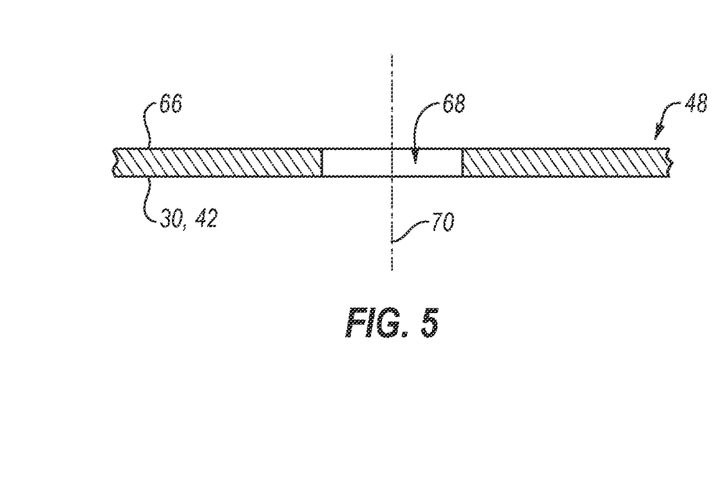
FIG. 5 is a partial side sectional illustration of an exterior member of the face skin taken along line 5-5 in FIG. 6.
Figure 6:
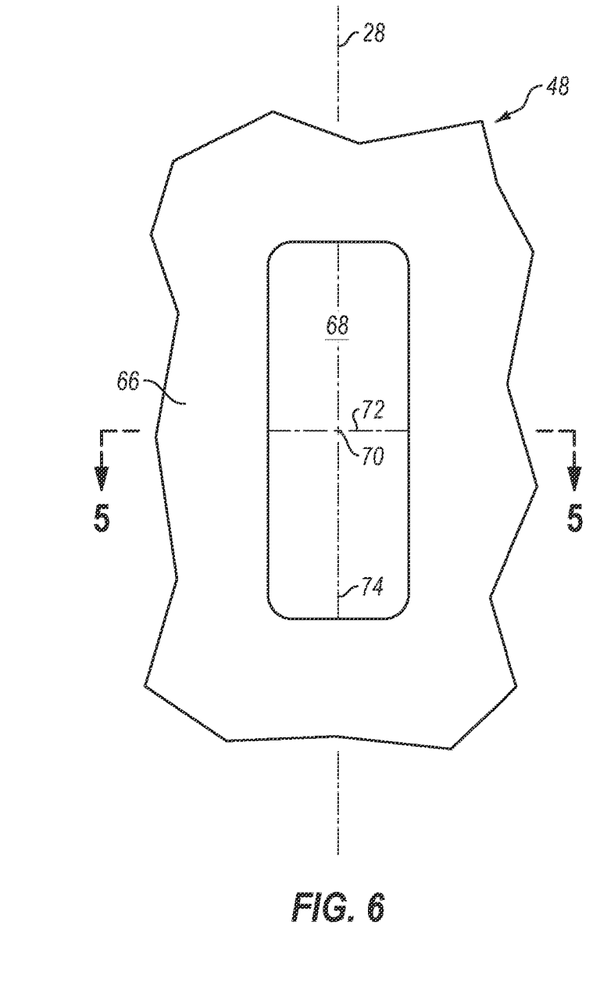
FIG. 6 is a partial illustration of the exterior member of the face skin.

Referring to FIG. 5, the exterior member 48 includes a plurality of exterior member perforations 68 ("exterior perforations"); e.g., through-holes such as slots or slits. Each of these exterior perforations 68 extends generally radially through the exterior member 48 along a centerline 70 of the respective exterior perforation 68 from the exterior member interior side 66 to the face skin exterior side 42. Referring to FIG. 6, each exterior perforation 68 may have an elongated cross-sectional geometry when viewed, for example, in a reference plane perpendicular to the exterior perforation centerline 70. The exterior perforation 68 of FIG. 6, for example, has a minor axis 72 and a major axis 74, where a major axis dimension of the exterior perforation 68 along the major axis 74 is larger than a minor axis dimension of the exterior perforation 68 along the minor axis 72. Example shapes of the elongated cross-sectional geometry include, but are not limited to, a polygon (e.g., a rectangle with rounded or sharp corners) and an oval. For ease of description, the major axis 74 is shown as being parallel with the centerline axis 28. It is contemplated, however, the major axis 74 may alternatively be perpendicular to the centerline axis 28 or otherwise (e.g., non-zero acutely) angularly offset from the centerline axis 28 depending upon operation characteristics of the acoustic panel 20. In general, the exterior perforation cross-sectional geometry and relative orientation of FIG. 6 is the same as the interior perforation cross-sectional geometry and relative orientation of FIG. 4. However, for select acoustic panel applications, the exterior perforation cross-sectional geometry may be different than (e.g., but, complimentary to) the interior perforation cross-sectional geometry.

Referring to FIGS. 1 and 2, the interior member 46 and the exterior member 48 are arranged together to form the face skin 34. The interior member 46 may extend axially and circumferentially along (e.g., a portion or an entirety of) the exterior member 48. The exterior member 48 may extend axially and circumferentially along (e.g., a portion or an entirety of) the interior member 46. The face skin members 46 and 48 thereby configure at least a portion or an entirety of the face skin 34 as a multi-layered structure; e.g., a dual layered structure. However, as discussed below in further detail, the face skin members 46 and 48 are configured to move (e.g., slide, translate, etc.) relative to one another.

Each of the face skin ports 50 extends generally radially through the face skin 34 from the face skin exterior side 42 to the face skin interior side 44. Each face skin port 50 of FIGS. 1 and 2, for example, includes a respective one of the interior perforations 56 and a respective one of the exterior perforations 68. More particularly, each interior perforation 56 may extend radially through the interior member 46 from the face skin interior side 44 to the respective exterior perforation 68. Similarly, each exterior perforation 68 may extend radially through the exterior member 48 from the face skin exterior side 42 to the respective interior perforation 56. Thus, each interior perforation 56 is axially and circumferentially aligned with and fluidly coupled with a respective one of the exterior perforations 68 to form a respective one of the face skin ports 50 through the face skin 34. Note, as discussed below in further detail, the specific alignment between the interior perforations 56 and the exterior perforations 68 may change during acoustic panel operation, engine operation or more generally aircraft operation.

The back skin 36 of FIGS. 1 and 2 formed by a relatively thin sheet or layer of (e.g., continuous and uninterrupted) material that extends axially along and circumferentially about the centerline axis 28. This back skin material may be the same as or different than the interior member material and/or the exterior member material. The back skin material, for example, may be or otherwise include a metal, a polymer (e.g., a thermoplastic or thermoset material) or a fiber reinforced composite (e.g., fiber reinforcement such as fiberglass, carbon fiber and/or aramid fibers within a polymer matrix). The back skin 36 has a radial thickness 76. This back skin thickness 76 extends radially between opposing sides 78 and 80 of the back skin 36, where the exterior side 80 of the back skin 36 is also the outer side 32 of the acoustic panel 20 of FIGS. 1 and 2. The back skin thickness 76 may remain uniform (e.g., constant) as the back skin 36 extends axially along and/or circumferentially about the centerline axis 28. The back skin thickness 76 of FIGS. 1 and 2 may be equal to the interior member thickness 52 and/or the exterior member thickness 64.

The cellular core 38 is arranged and extends radially between the face skin 34 and the back skin 36. The cellular core 38 may also be connected to (a) the face skin 34 and its interior member 46 and/or (b) the back skin 36. The cellular core 38, for example, may be welded, brazed, fused, adhered and/or otherwise bonded to the interior member 46 and/or the back skin 36. The cellular core 38 of FIGS. 1 and 2 extends axially along and circumferentially about the centerline axis 28. The cellular core 38 has a radial depth 82. This cellular core depth 82 extends radially between and to the face skin 34 at its interior side 44 and the back skin 36 at its interior side 78. The cellular core depth 82 may remain uniform (e.g., constant) as the cellular core 38 extends axially along and/or circumferentially about the centerline axis 28. The cellular core depth 82 may be substantially larger than the face skin thickness 40 and/or the back skin thickness 76. The cellular core depth 82, for example, may be at least ten to forty times (10-40×), or more, larger than the face skin thickness 40 and/or the back skin thickness 76. The cellular core 38 of the present disclosure, however, is not limited to such an exemplary dimensional relationship and may vary based on sound attenuation requirements, space requirements, etc.

Figure 7:
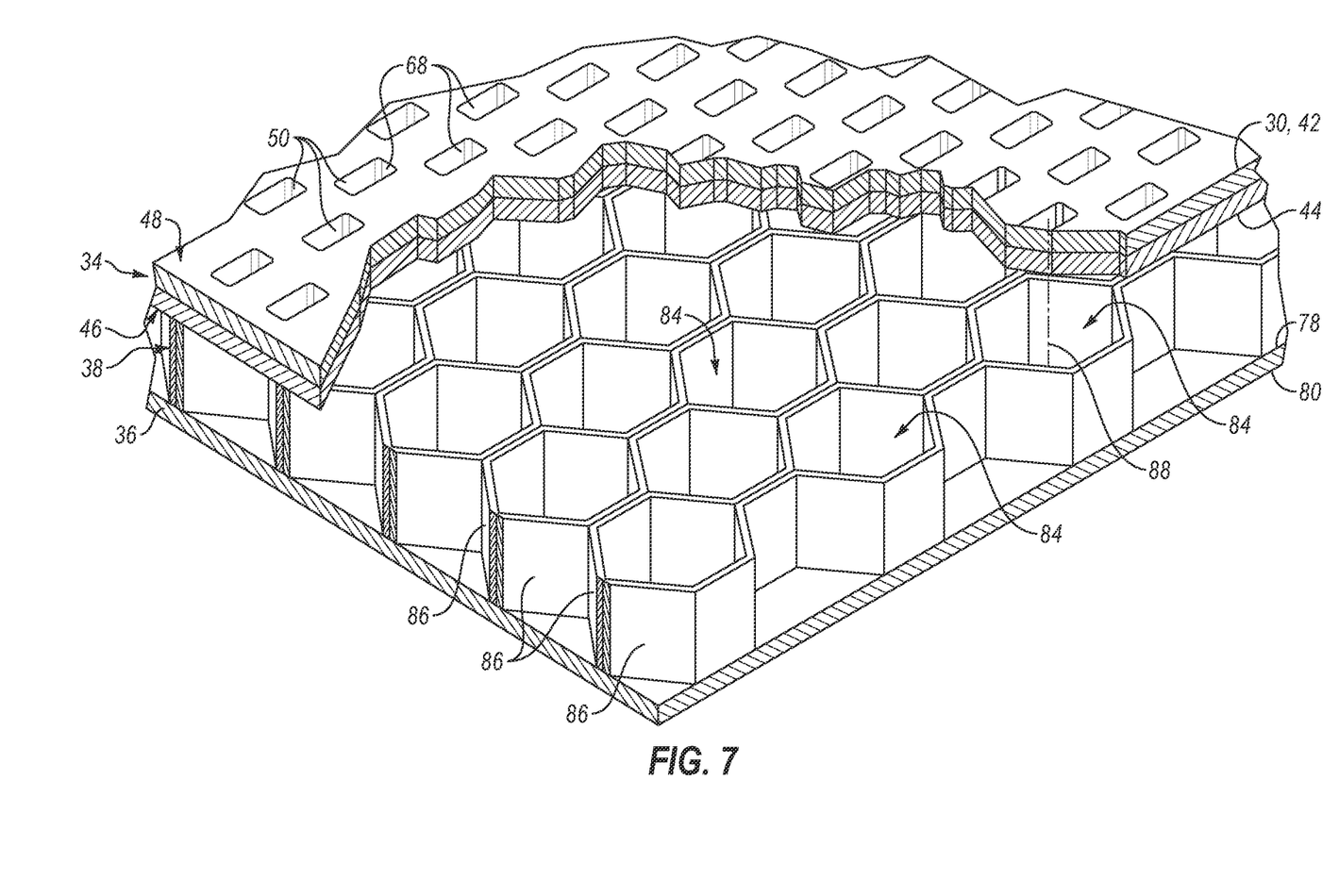
FIG. 7 is a partial perspective cutaway illustration of the acoustic panel.

The cellular core 38 of FIGS. 1 and 2 is configured with one or more core chambers 84 (e.g., internal chambers, acoustic resonance chambers, internal cavities, etc.) radially between the face skin 34 and the back skin 36. Referring to FIG. 7, the cellular core 38 may be configured as a honeycomb core. The cellular core 38 of FIG. 7, for example, includes a plurality of corrugated sidewalls 86. These corrugated sidewalls 86 are arranged in a side-by-side array and are connected to one another such that each neighboring (e.g., adjacent) pair of the corrugated sidewalls 86 forms an array of the core chambers 84 laterally (e.g., circumferentially or axially) therebetween. The cellular core 38 and its corrugated sidewalls 86 may be constructed from or otherwise include a core material such as metal; e.g., sheet metal. The present disclosure, however, is not limited to such an exemplary cellular core construction nor material.

Each core chamber 84 of FIGS. 1 and 2 extends radially within/through the cellular core 38 along a respective centerline 88 of the respective core chamber 84 between and to the face skin 34 at its face skin interior side 44 and the back skin 36 at its back skin interior side 78. One or more or all of the core chambers 84 may thereby each (e.g., axially and circumferentially) overlap and be fluidly coupled with a respective set of one or more of the face skin ports 50 and their respective interior perforations 56. Referring to FIG. 7, each of the core chambers 84 has a cross-sectional geometry (e.g., shape, size, etc.) when viewed in a reference plane; e.g., a plane perpendicular to the chamber centerline 88 of the respective core chamber 84. This chamber cross-sectional geometry may have a polygonal shape (e.g., a hexagonal shape, a rectangular shape, a triangular shape, etc.) or a free form shape. The present disclosure, however, is not limited to foregoing exemplary cellular core configuration. For example, one or more or all of the core chambers 84 may alternatively each have a circular, elliptical or other non-polygonal cross-sectional geometry. Furthermore, various other types of honeycomb cores and, more generally, various other types of cellular cores for an acoustic panel are known in the art, and the present disclosure is not limited to any particular ones thereof.

The acoustic panel 20 of FIGS. 1 and 2 is configured as a single-degree of freedom (SDOF) acoustic panel. One or more or all of the core chambers 84 of FIGS. 1 and 2, for example, each extends radially uninterrupted between and to the face skin 34 and the back skin 36. With such an arrangement, the acoustic panel 20 may be tuned to attenuate, for example, a select frequency of sound, which tuning may be based on a radial height of each core chamber 84/the cellular core depth 82.

During operation of the acoustic panel 20 of FIGS. 1 and 2, sound waves may enter a core chamber 84 through the respective face skin port(s) 50. These sound waves may travel through the core chamber 84 and reflect against the back skin 36. The reflected sound waves may travel back through the core chamber 84 and exit the acoustic panel 20 through the respective face skin port(s) 50, where those reflected sound waves may be out of phase from and destructively interfere with incoming soundwaves; i.e., pressure waves. Of course, the sound waves may also or alternatively reflect against one or more other elements of the acoustic panel 20 which may further influence sound attenuation. Moreover, sound attenuation may be influenced by frictional losses in the face skin ports 50 (e.g., when pressure waves move in and out of the face skin ports 50 as the chambers 84 are energized and the acoustic panel 20 operates about its resonance frequency(ies)) thus converting the mechanical energy into heat dissipation.

During an aircraft flight, the propulsion system engine may operate at various different power settings. For example, during aircraft takeoff and/or climb, the propulsion system engine may operate at a relatively high power setting. During aircraft flyover, the propulsion system engine may operate at an intermediate (e.g., mid) power setting. During aircraft approach and/or landing, the propulsion system engine may operate at a relatively low power setting. Each of these engine power settings, as well as various power settings in between, may be associated with its own sound pressure level (SPL). For example, at the high power setting, the propulsion system engine and its propulsor rotor (e.g., a fan rotor) may generate a relatively high sound pressure level. At the intermediate power setting, the propulsion system engine and its propulsor rotor (e.g., a fan rotor) may generate an intermediate sound pressure level. At the low power setting, the propulsion system engine and its propulsor rotor (e.g., a fan rotor) may generate a relatively low sound pressure level.

A flow resistance (R) along the acoustic panel 20 may non-linearly increase as the sound pressure level of the sound waves increases. Generally speaking, the higher the flow resistance, the less permeable a fluid such as air is through a porous material such as the face skin 34. Thus, optimum acoustic panel characteristics like acoustic flow resistance depend on the sound pressure level. Acoustic properties or characteristics of the acoustic panel 20 may therefore be changed (e.g., adapted, adjusted) to effectively respond to and attenuate a lower or higher sound pressure level. For example, the acoustic properties/characteristics of the acoustic panel 20 may be changed to provide (or move closer to) an optimum flow resistance for each sound pressure level and flow (e.g., Mach number in the flowpath 26) operating condition.

Parameters associated with the face skin ports 50 may affect the capability of the acoustic panel 20 to attenuate sound as well as aerodynamic characteristics of the acoustic panel 20. For example, the acoustic panel 20 and, more particularly, the face skin 34 of FIGS. 8A-C have a percentage of open area (POA). The term "percentage of open area" may describe a percentage of a surface area of an element that is occupied by open area; e.g., voids from the face skin ports 50. This open area may be defined by a sum of flow areas 90 through the face skin 34. The term "flow area" may describe a minimum flow area (e.g., a throat) through a respective face skin port 50. This flow area 90 represents an area of (e.g., axial and circumferential) overlap between each exterior perforation 68 and a respective one of the interior perforations 56. Where the overlap between the face skin perforations 56 and 68 increases (e.g., see FIG. 8A), the flow area 90 increases. As the percentage of open area of the face skin 34 increases (e.g., see FIG. 8A), the face skin 34 becomes more permeable to a flow of fluid such as air. Conversely, where the overlap between the face skin perforations 56 and 68 decreases (e.g., see FIG. 8C), the flow area 90 decreases. As the percentage of open area of the face skin 34 decreases (e.g., see FIG. 8C), the face skin 34 becomes less permeable to the flow of fluid. The face skin members 46 and 48 may thereby be arranged relative to one another to provide a select (e.g., optimum, enhanced, etc.) complex acoustic impendence (Z) value for the high, the intermediate and the low power settings as well as various power settings in-between.

Figure 8A:
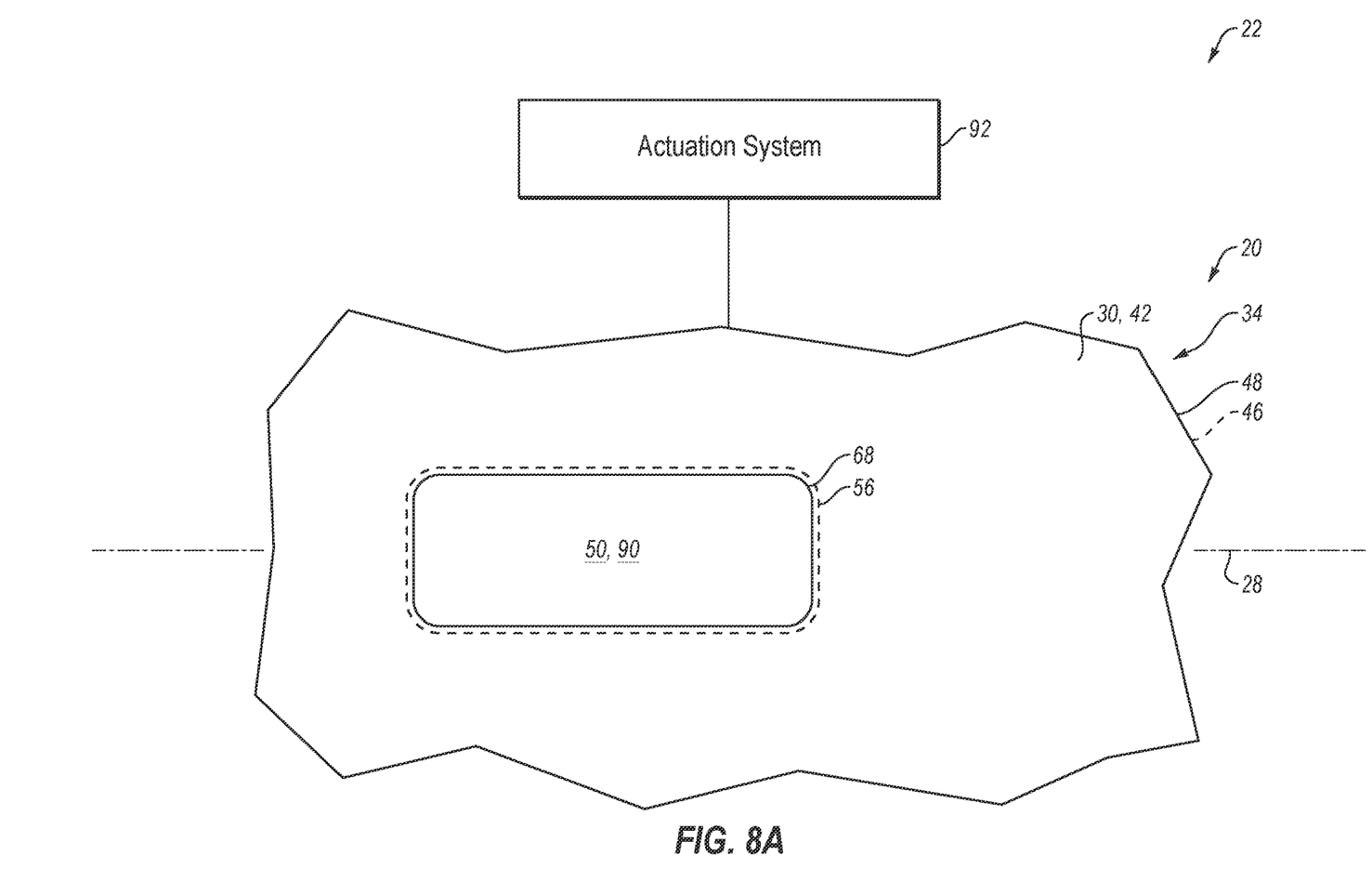
FIGS. 8A-C are partial schematic illustrations of the acoustic system with the members of the face skin in various arrangements.

When the propulsion system engine is operating at a relatively high power setting with a relatively high sound pressure level, the face skin members 46 and 48 may be arranged at a first position (e.g., a fully open and/or maximum POA position) as shown in FIG. 8A. At this first position, the face skin 34 may have a relatively high percentage of open area; e.g., 90-100% of maximum POA for the acoustic panel 20. For example, a relatively high percentage (e.g., 90-100%) of each exterior perforation 68 may overlap a respective one of the interior perforations 56. Similarly, a relatively high percentage (e.g., 90-100%) of each interior perforation 56 may also or alternatively overlap a respective one of the exterior perforations 68. The flow area 90 through each face skin port 50 may thereby be sized to optimize the complex acoustic impendence (Z) value for the high sound pressure level associated with high power setting operation. The present disclosure, however, is not limited to the foregoing exemplary overlap percentages as these percentages may vary based on perforation size, shape as well as other engine operating parameters.

Figure 8B:
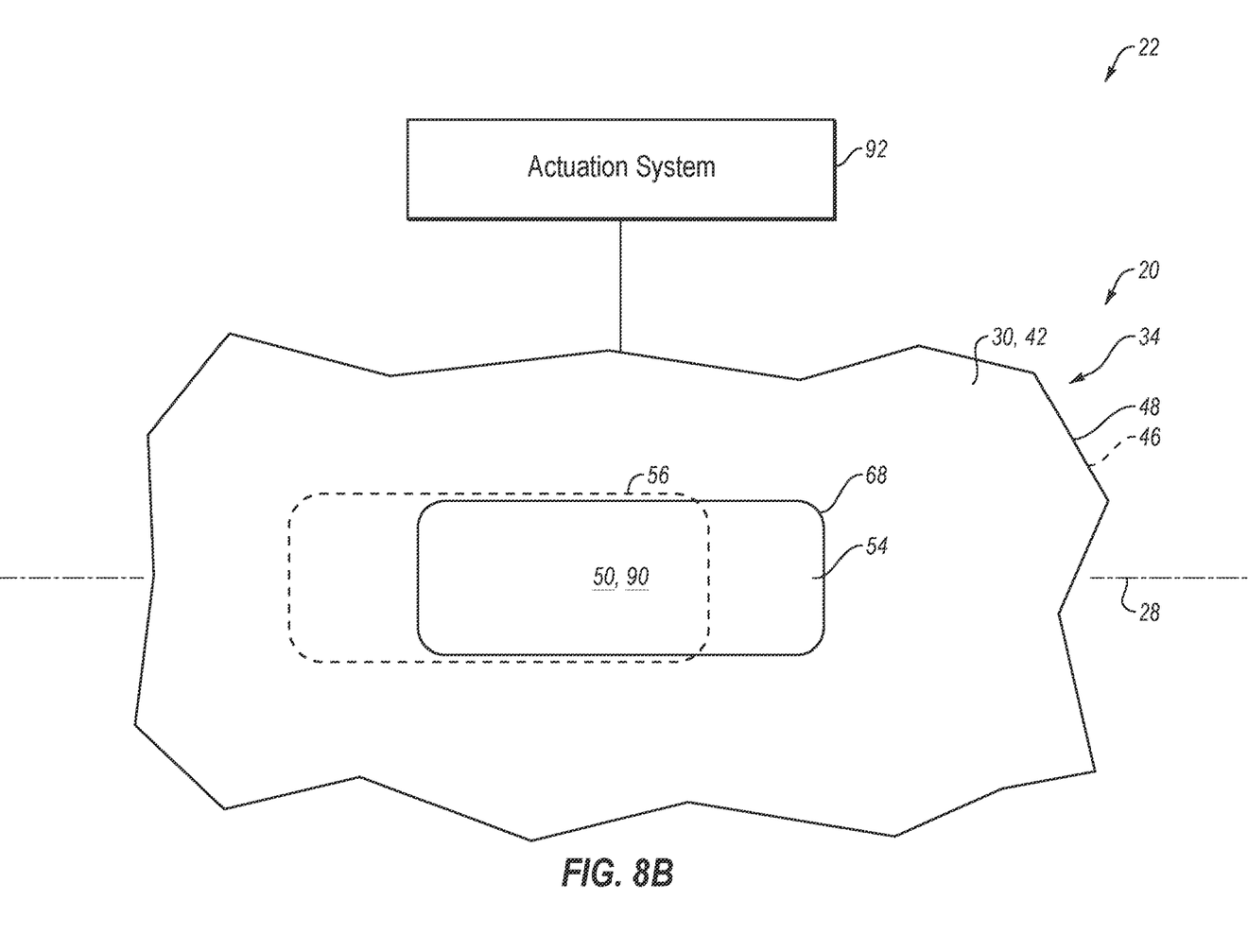

When the propulsion system engine is operating at an intermediate power setting with an intermediate sound pressure level, the face skin members 46 and 48 may be arranged at a second position (e.g., intermediate position) as shown in FIG. 8B. At this second position, the face skin 34 may have an intermediate percentage of open area; e.g., 80-90% of maximum POA for the acoustic panel 20. For example, an intermediate percentage (e.g., 80-90%) of each exterior perforation 68 may overlap a respective one of the interior perforations 56. Similarly, an intermediate percentage (e.g., 80-90%) of each interior perforation 56 may also or alternatively overlap a respective one of the exterior perforations 68. The flow area 90 through each face skin port 50 may thereby be sized to optimize the complex acoustic impendence (Z) value for the intermediate sound pressure level associated with intermediate power setting operation. The present disclosure, however, is not limited to the foregoing exemplary overlap percentages as these percentages may vary based on perforation size, shape as well as other engine operating parameters.

Figure 8C:
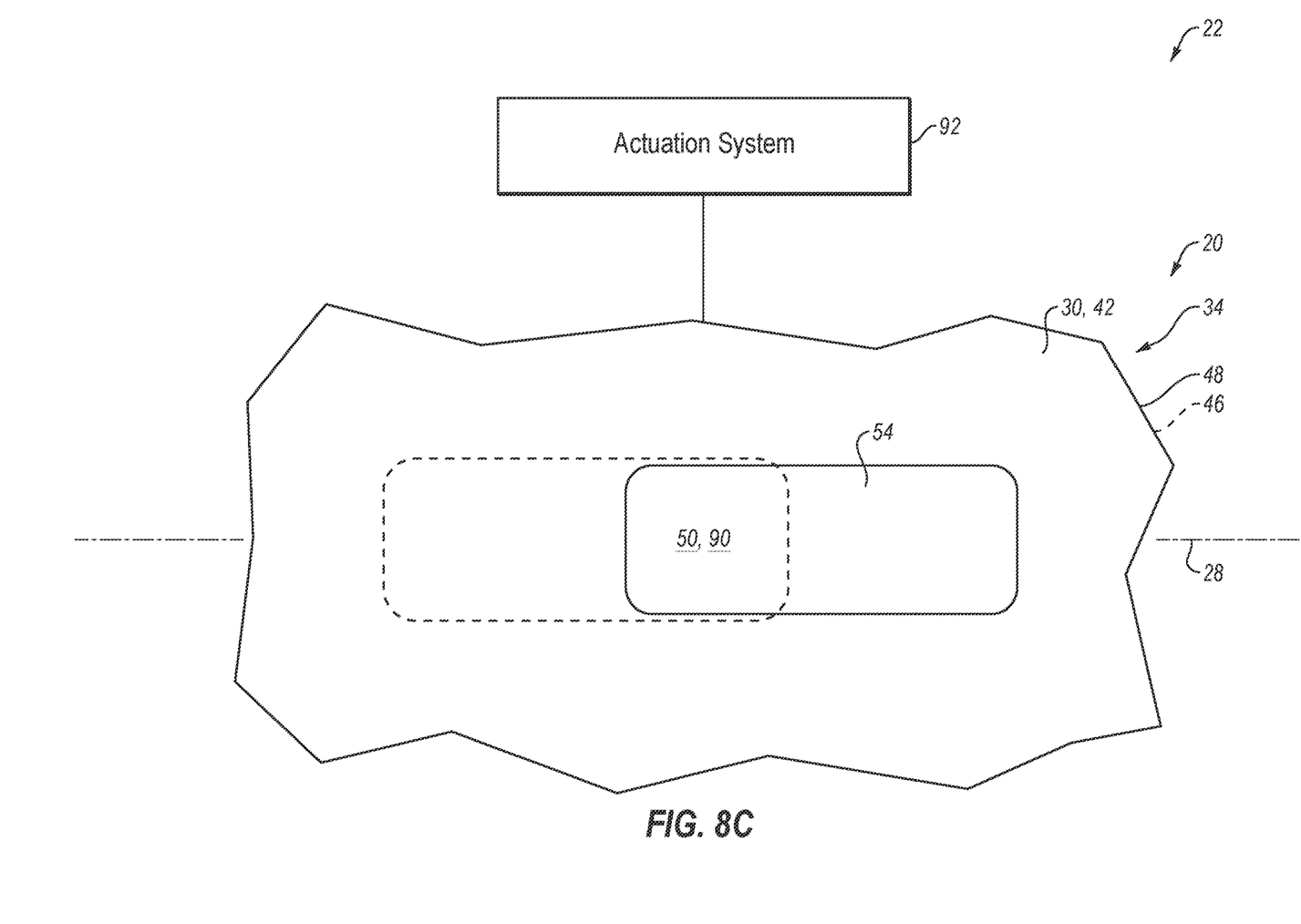

When the propulsion system engine is operating at a relatively low power setting with a relatively low sound pressure level, the face skin members 46 and 48 may be arranged at a third position (e.g., a fully restricted and/or minimum PA position) as shown in FIG. 8C. At this third position, the face skin 34 may have a relatively low percentage of open area; e.g., 50-70% of maximum POA for the acoustic panel 20. For example, a relatively low percentage (e.g., 50-70%) of each exterior perforation 68 may overlap a respective one of the interior perforations 56. Similarly, a relatively low percentage (e.g., 50-70%) of each interior perforation 56 may also or alternatively overlap a respective one of the exterior perforations 68. The flow area 90 through each face skin port 50 may thereby be sized to optimize the complex acoustic impendence (Z) value for the low sound pressure level associated with low power setting operation. The present disclosure, however, is not limited to the foregoing exemplary overlap percentages as these percentages may vary based on perforation size, shape as well as other engine operating parameters.

To rearrange the face skin members 46 and 48 relative to one another, the acoustic panel 20 of FIGS. 8A-C is configured with an actuation system 92. This actuation system 92 is operatively coupled to the face skin 34 and one of its face skin members 46, 48—an actuatable face skin member. For example, referring to FIG. 9A, the actuation system 92 may be (e.g., directly or indirectly) connected to the interior member 46; here, the actuatable face skin member. The exterior member 48 may be grounded (e.g., fixed) to another stationary support or frame of the aircraft. The actuation system 92 may thereby move (e.g., slide, translate, etc.) the interior member 46 (and elements 36 and 38) along the exterior member 48. In another example, referring to FIG. 9B, the actuation system 92 may be (e.g., directly or indirectly) connected to the exterior member 48; here, the actuatable face skin member. The interior member 46 (and elements 36 and 38) may be grounded (e.g., fixed) to another stationary support or frame of the aircraft. The actuation system 92 may thereby move (e.g., slide, translate, etc.) the exterior member 48 along the interior member 46.

For ease of description, the movement of the actuatable face skin member 46, 48 is shown in FIGS. 8A-C as axial movement along the centerline axis 28. However, the movement may alternatively be circumferential movement about the centerline axis 28. Still alternatively, the movement may include both an axial and circumferential component; e.g., the actuatable face skin member 46, 48 may spiral along and about the centerline axis 28.

Figure 9A:
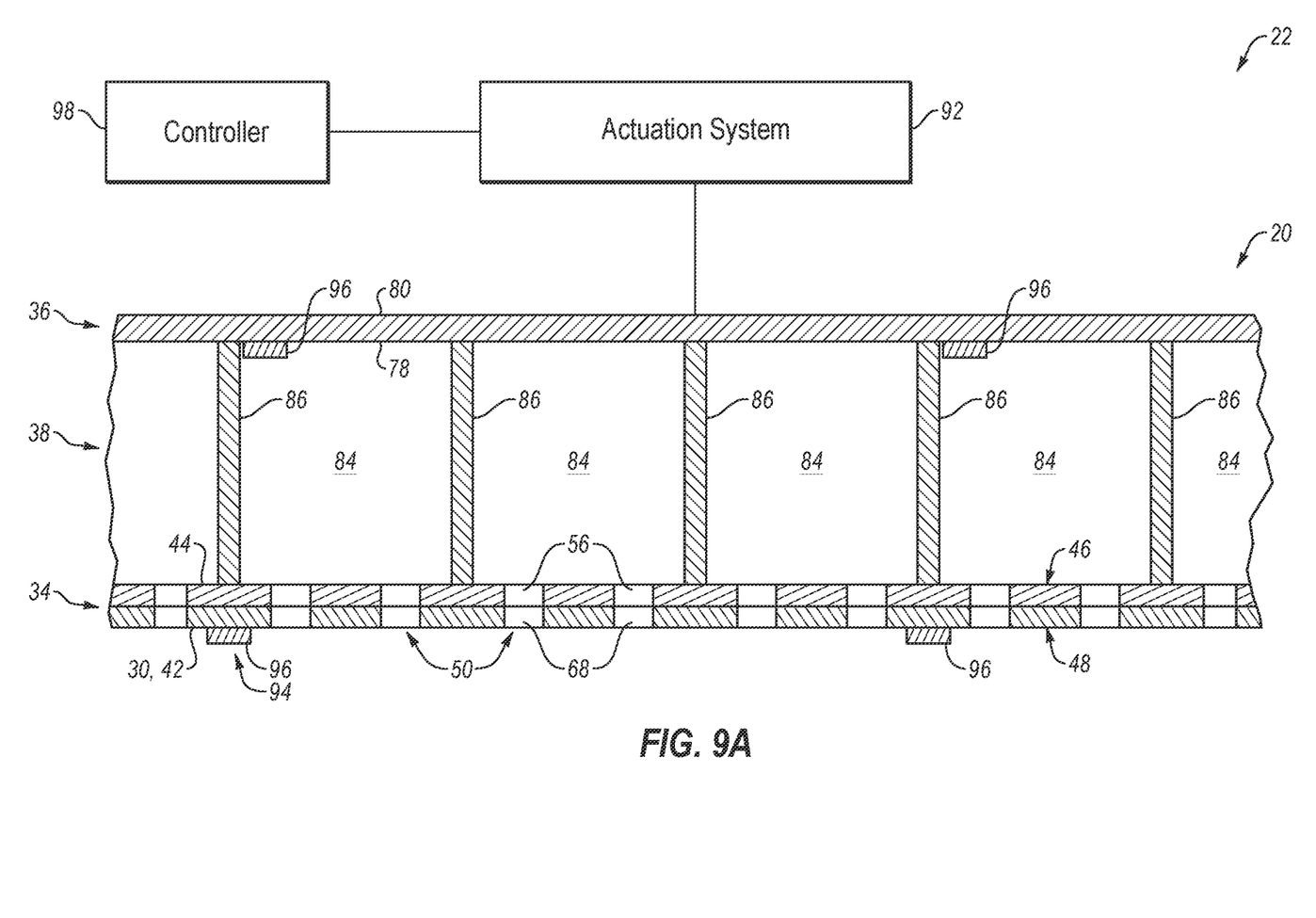
FIGS. 9A and 9B are partial schematic sectional illustrations of the acoustic system with an actuation system coupled to and configured to move different members of the face skin.
Figure 9B:
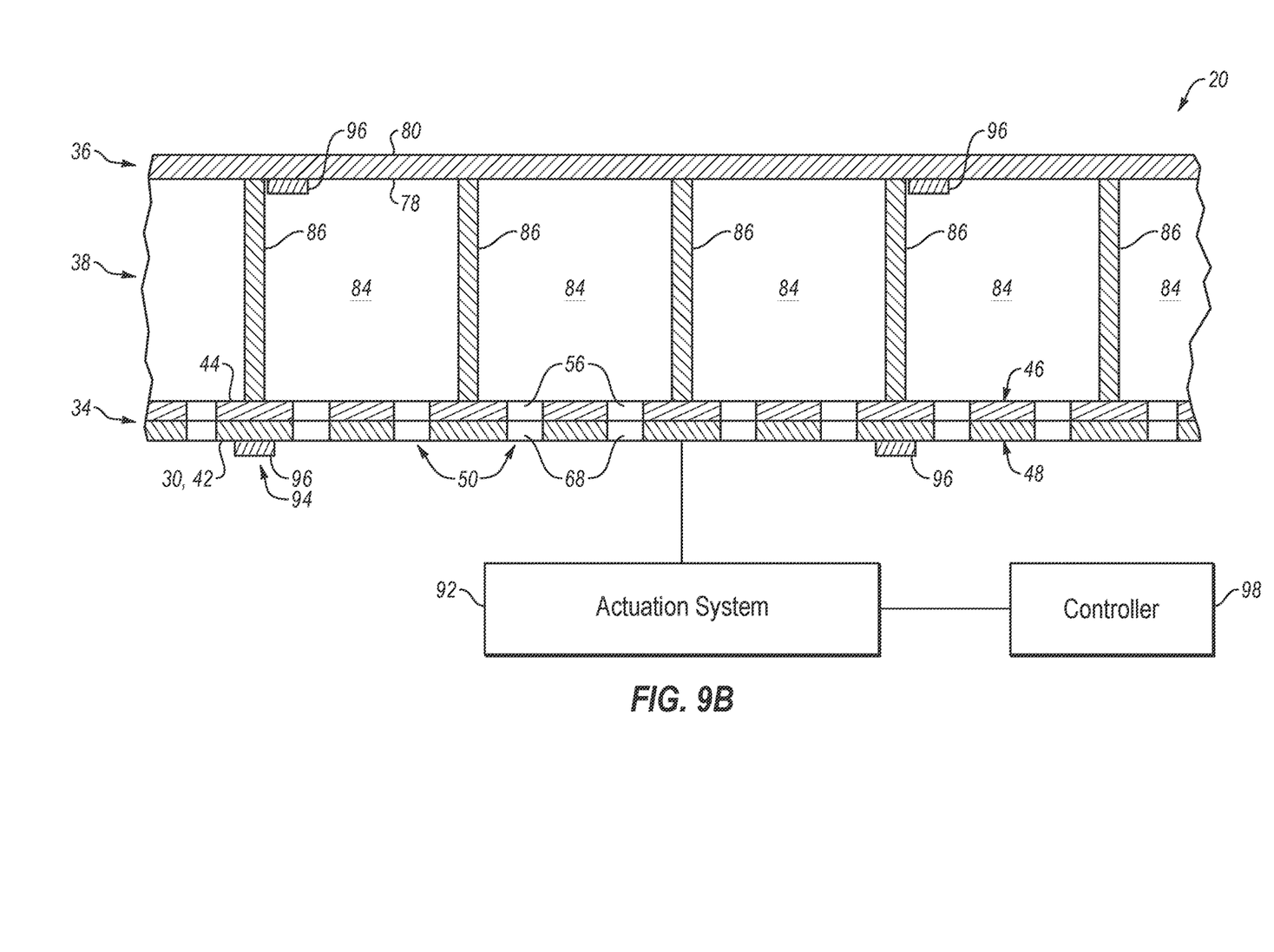

The acoustic system 22 of FIGS. 9A and 9B may also include a sensor system 94. This sensor system 94 is configured to monitor (e.g., measure or otherwise determine) one or more acoustic parameters at the acoustic panel 20 and its face skin 34 using sensors 96. Examples of the acoustic parameters include, but are not limited to, a sound pressure level at the face skin 34 and an acoustic impendence at the face skin 34 and at the back skin 36. Examples of the sensors 96 include, but are not limited to, microphones, pressure transducers, and pressure probes.

The sensor system 94 of FIGS. 9A and 9B is also configured to provide (e.g., generate and output) a sensor signal indicative of the one or more acoustic parameters, for example, from each sensor 96. Based on these sensor signals, the actuation system 92 may move the actuatable face skin member 46, 48. For example, a controller 98 (incorporated into or discrete from the actuation system 92) may receive the sensor signals and process the sensor signals to provide a control signal. More particularly, the controller 98 is programmed to process the sensor signals to educe a measured impedance. The controller 98 may compare the measured impedance ($Z_{meas}$) to an optimum impedance ($Z_{opt}$) to generate the control signal, which control signal may be in the form of an output signal or power from the controller 98 to drive the actuation system 92. This control signal may be proportional to intended adjustment to the percentage of open area to the fan skin 34.

The actuation system 92 may move the actuatable face skin member 46, 48 in response to the control signal. With this operability, the actuatable face skin member 46, 48 may be moved to provide a select (e.g., optimal) percentage of open area/a select (e.g., optimal) acoustic impedance for the sound pressure level measured at the acoustic panel 20. Of course, the control signal may also be generated based on another acoustic parameter such as the acoustic impedance at the acoustic panel 20. For example, the controller 98 may utilize feedback to determine if the predicted acoustic impedance is equal to or close to the measured acoustic impedance. The acoustic system 22 may thereby provide tuned (e.g., optimized) acoustic attenuation across various different operating conditions/phases of aircraft flight. By contrast, a typical prior art acoustic panel is tuned for a specific operating condition/phase of flight, and settles for sub-optimal operation at other operating conditions/phases of flight.

The controller 98 may process the sensor signal using models and/or look-up tables. The controller 98 may thereby provide the control signal based on the sensor signal (e.g., measurements) as well as operating conditions of the propulsion system engine. Examples of the engine operating conditions include, but are not limited to, the engine power setting, a rotational speed of an engine rotor, a speed of the aircraft, and a temperature of ambient air.

The acoustic panel 20 is described above as a single-degree of freedom acoustic panel for ease of description. The present disclosure, however, is not limited to such an exemplary acoustic panel configuration. For example, referring to FIG. 10, the acoustic panel 20 may alternatively be configured as a multi-degree of freedom (MDOF) acoustic panel such as, but not limited to, a double-degree of freedom (DDOF) acoustic panel. One or more or all of the core chambers 84 of FIG. 10, for example, is provided with at least (or only) one respective septum 100; e.g., a perforated and/or porous member. Each septum 100 extends laterally across the respective core chamber 84 to divide that core chamber 84 into a plurality of sub-chambers 84A and 84B. These sub-chambers 84A and 84B are fluidly coupled with one another (e.g., radially) across the respective septum 100 through one or more perforations 102 (or pores) in that septum 100. With such an arrangement, the acoustic panel 20 may be tuned to attenuate multiple frequencies of sound or to widen a frequency band of attenuation, which tuning may be based on the radial height of each core chamber 84/the cellular core depth 82, a radial distance between each septum 100 and the face skin 34 as well as the flow resistance (R) for each layer.

Figure 10:
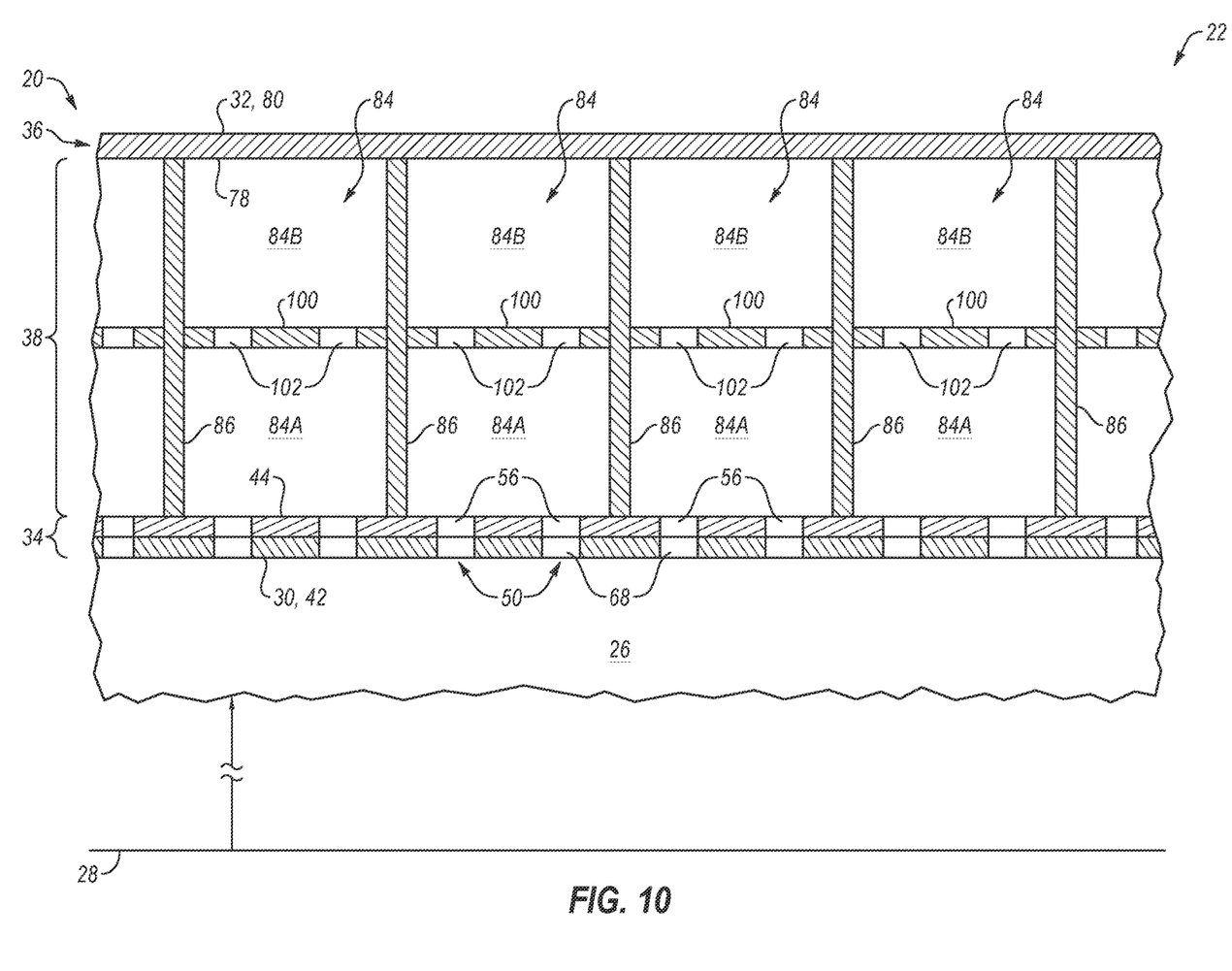
FIG. 10 is a partial side sectional illustration of the acoustic panel configured as a multi-degree of freedom acoustic panel.

During operation of the acoustic panel 20 of FIG. 10, sound waves may enter a core chamber 84 through the respective face skin port(s) 50. Some of these sound waves may travel through the near sub-chamber 84A and reflect against solid portion(s) of the septum 100. The reflected sound waves may travel back through the near sub-chamber 84A and exit the acoustic panel 20 through the respective face skin port(s) 50, where those reflected sound waves may be out of phase from and destructively interfere with incoming soundwaves of a first frequency. Other sound waves may pass through porous portion(s) of the septum 100 and travel through the far sub-chamber 84B and reflect against the back skin 36. The reflected sound waves may travel back through the far sub-chamber 84B, across the septum 100, through the near sub-chamber 84A and exit the acoustic panel 20 through the respective face skin port(s) 50, where those reflected sound waves may be out of phase from and destructively interfere with other incoming soundwaves of a second frequency. Of course, the sound waves may also or alternatively reflect against one or more other elements of the acoustic panel 20 which may further influence sound attenuation.

Figure 11:
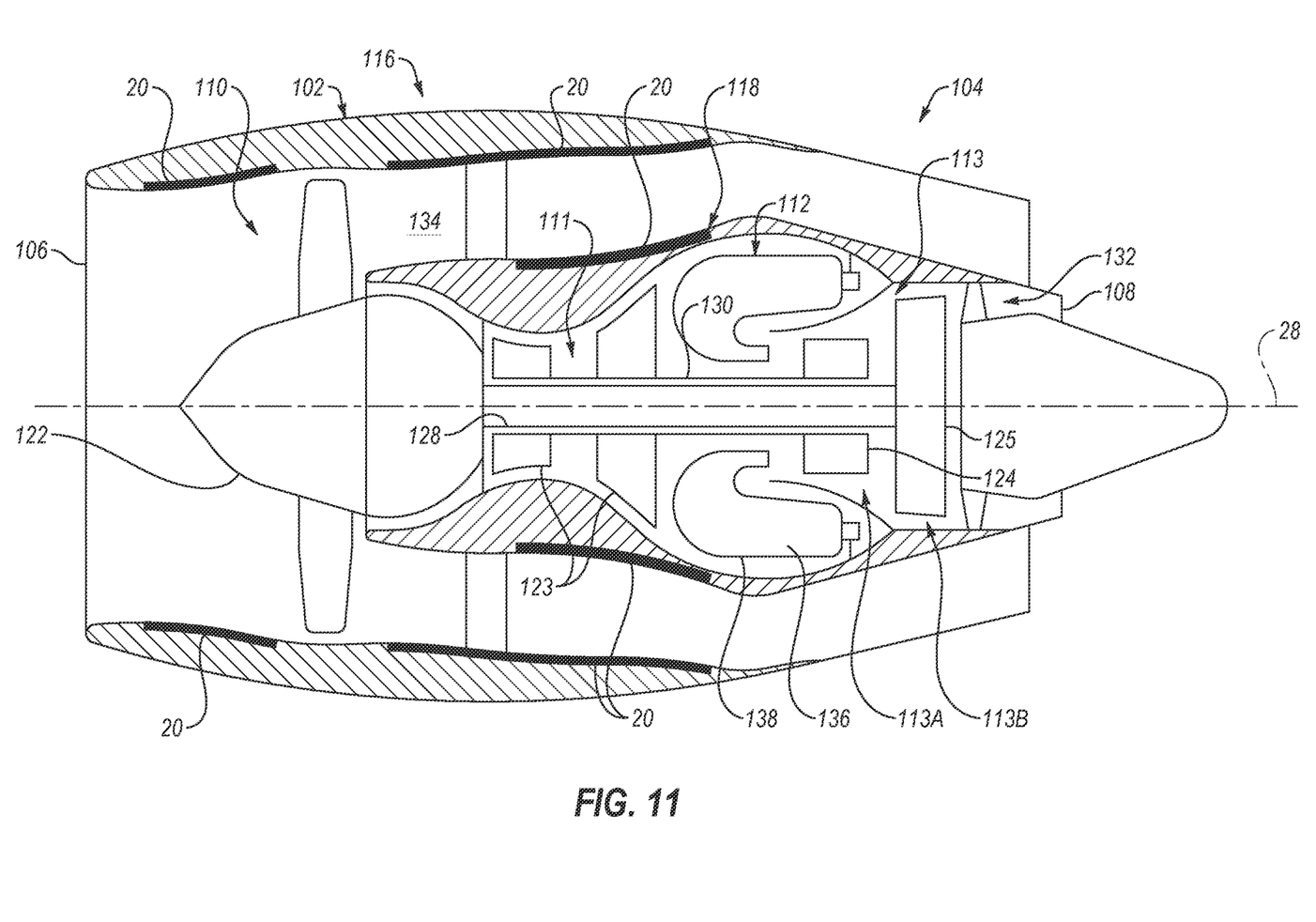
FIG. 11 is a schematic side sectional illustration of an aircraft propulsion system configured with one or more of the acoustic panels.

FIG. 11 illustrates an example of the aircraft propulsion system with which the one or more of the acoustic panels 20 may be configured. This aircraft propulsion system includes a turbofan gas turbine engine 104. The gas turbine engine 104 of FIG. 11 extends axially along the centerline axis 28 between an upstream airflow inlet 106 and a downstream airflow exhaust 108. The gas turbine engine 104 includes a fan section 110, a compressor section 111, a combustor section 112 and a turbine section 113. The turbine section 113 includes a high pressure turbine (HPT) section 113A and a low pressure turbine (LPT) section 113B, which LPT section 113B may also be referred to as a power turbine (PT) section.

The engine sections 110-113B are arranged within the engine housing 116. This engine housing 116 includes an inner housing structure 118 and an outer housing structure 120. The inner housing structure 118 may house one or more of the engine sections 111-113B; e.g., a core of the gas turbine engine 104. The outer housing structure 120 may house at least the fan section 110. The inner and the outer housing structures 118 and 20 of FIG. 11 also form a bypass duct. The inner and/or the outer housing structure 120 may each include one or more of the acoustic panels 20.

Each of the engine sections 110, 111, 113A and 113B includes a respective bladed rotor 122-125. Each of these bladed rotors 122-125 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 122 is connected to and driven by the LPT rotor 125 through a low speed shaft 128. The compressor rotor 123 is connected to and driven by the HPT rotor 124 through a high speed shaft 130. The shafts 128 and 130 are rotatably supported by a plurality of bearings (not shown). Each of these bearings is connected to the engine housing 116 by at least one stationary structure.

During operation, air enters the gas turbine engine 104 through the airflow inlet 106. This air is directed through the fan section 110 and into a core flowpath 132 and a bypass flowpath 134 (e.g., the flowpath 26). The core flowpath 132 extends sequentially through the engine sections 111-113B. The air within the core flowpath 132 may be referred to as "core air". The bypass flowpath 134 extends through the bypass duct, which bypasses the engine core. The air within the bypass flowpath 134 may be referred to as "bypass air".

The core air is compressed by the compressor rotor 123 and directed into a combustion chamber 136 of a combustor 138 in the combustor section 112. Fuel is injected into the combustion chamber 136 and mixed with the compressed core air to provide a fuel-air mixture. This fuel air mixture is ignited and combustion products thereof flow through and sequentially cause the HPT rotor 124 and the LPT rotor 125 to rotate. The rotation of the HPT rotor 124 drives rotation of the compressor rotor 123 and, thus, compression of the air received from a core airflow inlet. The rotation of the LPT rotor 125 drives rotation of the fan rotor 122, which propels the bypass air through and out of the bypass flowpath 134. The propulsion of the bypass air may account for a majority of thrust generated by the gas turbine engine 104.

The acoustic system 22 and its acoustic panel 20 may be included in various gas turbine engines other than the one described above. The acoustic system 22 and its acoustic panel 20, for example, may be included in a geared gas turbine engine where a geartrain connects one or more shafts to one or more rotors in a fan section, a compressor section and/or any other engine section. Alternatively, the acoustic system 22 and its acoustic panel 20 may be included in a gas turbine engine configured without a geartrain; e.g., a direct drive gas turbine engine. The acoustic system 22 and its acoustic panel 20 may be included in a gas turbine engine configured with a single spool, with two spools (e.g., see FIG. 11), or with more than two spools. The gas turbine engine may be configured as a turbofan engine, a turbojet engine, a turboprop engine, a turboshaft engine, a propfan engine, a pusher fan engine or any other type of gas turbine engine. The gas turbine engine may alternatively be configured as an auxiliary power unit (APU). The present disclosure therefore is not limited to any particular types or configurations of gas turbine engines. Furthermore, while the acoustic system 22 and its acoustic panel 20 is described above with respect to various aircraft applications, the acoustic system 22 and its acoustic panel 20 of the present application may alternatively be used for non-aircraft applications.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A method for sound attenuation, comprising:
   monitoring an acoustic parameter at an acoustic panel and providing a sensor signal indicative of the acoustic parameter within a cellular core, wherein the acoustic panel includes a face skin, a back skin and the cellular core connected to the face skin and the back skin, the face skin comprises a plurality of ports extending through the face skin, the cellular core comprises a plurality of chambers, each of the plurality of chambers extends from the face skin to the back skin, and each of the plurality of chambers is fluidly coupled with a respective one or more of the plurality of ports; and
   manipulating the face skin to change an acoustic impedance of the face skin based on the sensor signal.

2. An acoustic system, comprising:
   a face skin including a first member, a second member and a plurality of ports extending through the face skin, the first member comprising a plurality of first perforations, the second member comprising a plurality of second perforations and configured to move along the first member, and each of the plurality of ports including a respective one of the plurality of first perforations and a respective one of the plurality of second perforations;
   an actuation system configured to move the second member along the first member;
   a back skin; and
   a cellular core arranged between the face skin and the back skin, the cellular core comprising a plurality of chambers, each of the plurality of chambers extending between the face skin and the back skin, and each of the plurality of chambers fluidly coupled with a respective one or more of the plurality of ports;
   wherein the second member is configured to spiral along and about a centerline axis to change an acoustic impedance of the face skin.

\* \* \* \* \*